US011261687B2

(12) United States Patent
Yu et al.

(10) Patent No.: US 11,261,687 B2
(45) Date of Patent: Mar. 1, 2022

(54) WELLHEAD SEALING DEVICE OF SUCKER-ROD PUMPING MACHINE

(71) Applicants: Licheng Yu, Heilongjiang (CN); Kao Si, Heilongjiang (CN)

(72) Inventors: Licheng Yu, Heilongjiang (CN); Kao Si, Heilongjiang (CN)

( * ) Notice: Subject to any disclaimer, the term of this patent is extended or adjusted under 35 U.S.C. 154(b) by 0 days.

(21) Appl. No.: 17/007,414

(22) Filed: Aug. 31, 2020

(65) Prior Publication Data

US 2020/0399972 A1   Dec. 24, 2020

Related U.S. Application Data

(63) Continuation of application No. 16/068,594, filed as application No. PCT/CN2016/072838 on Jan. 29, 2016, now Pat. No. 10,760,367.

(30) Foreign Application Priority Data

Jan. 8, 2016   (CN) .......................... 201610013004.2

(51) Int. Cl.
| | |
|---|---|
| *E21B 33/04* | (2006.01) |
| *E21B 33/08* | (2006.01) |
| *F16J 15/00* | (2006.01) |
| *E21B 33/06* | (2006.01) |

(52) U.S. Cl.
CPC ............ *E21B 33/04* (2013.01); *E21B 33/085* (2013.01); *F16J 15/002* (2013.01); *E21B 33/06* (2013.01)

(58) Field of Classification Search
CPC ........ E21B 33/04; E21B 33/085; F16J 15/002
See application file for complete search history.

(56) References Cited

U.S. PATENT DOCUMENTS

| | | | | | |
|---|---|---|---|---|---|
| 3,887,196 | A | * | 6/1975 | Renfrow | F04B 53/164 277/318 |
| 3,939,910 | A | * | 2/1976 | Bruce | E21B 33/06 166/84.2 |
| 4,907,650 | A | * | 3/1990 | Heinonen | E21B 33/08 166/80.1 |
| 6,412,783 | B1 | * | 7/2002 | Finnestad | E21B 33/08 166/84.1 |
| 6,637,509 | B2 | * | 10/2003 | Farquharson | E21B 33/08 166/241.2 |
| 7,284,602 | B2 | * | 10/2007 | Tessier | E21B 34/02 166/84.1 |

(Continued)

FOREIGN PATENT DOCUMENTS

| | | | | |
|---|---|---|---|---|
| CA | 2629278 | C | * 5/2009 | .......... F04C 15/0038 |
| CN | 200985764 | Y | 12/2007 | |
| CN | 201024953 | Y | 2/2008 | |

(Continued)

*Primary Examiner* — Matthew R Buck
(74) *Attorney, Agent, or Firm* — Novick, Kim & Lee, PLLC; Allen Xue

(57) ABSTRACT

A polished rod sealing device for an oil pumping machine includes a built-in stuffing box. The built-in stuffing box is arranged inside oil pipe enlargement press cap and can seal the polished rod of the oil pumping machine. The sealing device maintains dynamic coaxiality between the polished rod and the stuffing box, and reduces eccentric wear of the sealing packing resulted from the polished rod. The sealing device also provides lubrication between the polished rod and the sealing packing.

4 Claims, 8 Drawing Sheets

(56) References Cited

U.S. PATENT DOCUMENTS 10,760,367 B2 * 9/2020 Yu .......................... F16N 15/00

FOREIGN PATENT DOCUMENTS

| CN | 101205801 A | 6/2008 |
| CN | 101608537 A | 12/2009 |
| CN | 201778723 U | 3/2011 |
| CN | 103628838 A | 3/2014 |
| CN | 204040980 A | 12/2014 |
| CN | 204175227 A | 2/2015 |
| CN | 204532224 U | 8/2015 |
| CN | 205349277 U | 6/2016 |

* cited by examiner

WELLHEAD SEALING DEVICE OF SUCKER-ROD PUMPING MACHINE

TECHNICAL FIELD

The present disclosure relates to a stuffing box of a polished rod sealing device of an oil pumping machine, in particular to an oil pipe enlargement base, an oil pipe enlargement press cap and a built-in stuffing box of a polished rod sealing device of a sucker-rod oil pumping machine.

BACKGROUND ART

A polished rod sealing device usually comprises a blow-out prevention unit, a well shut-in unit, a righting and deviation-correcting unit, and a stuffing box. The stuffing box is the core part for operation, and the wellhead of a sucker-rod oil pumping machine in working state is sealed by compressing the sealing packing in the stuffing box. The function of the polished rod sealing device is to ensure wellhead sealing when the sucker-rod oil pumping machine is in working state, sealing packing replacing state, or rod broken state.

The sealing mechanism of the wellhead sealing device of a sucker-rod oil pumping machine is as follows: the sealing packing is filled in an annular space formed by the polished rod and the stuffing box, and a press ring presses the sealing packing downward, so that the sealing packing is deformed and thereby the pressure between the polished rod, the inner wall of the stuffing box and the sealing packing is increased and the purpose of sealing the polished rod is achieved.

When the oil pumping machine is in working state, the polished rod is pulled by the down-hole sucker-rod oil pump and the oil pumping machine on the surface, the moving track of the polished rod always has a radial displacement component, the stuffing box and the moving polished rod can't be kept in a dynamically coaxial state, resulting in eccentric wear of the sealing packing. The lower the coaxiality is, the more severe the eccentric wear is. Consequently:

I. The tightening cycle and replacement cycle of the sealing packing are very short, the labor intensity of the workers is high, and the production efficiency is low.

II. The pressure of the sealing packing on the polished rod is so large that the polished rod is worn severely and the service life of the polished rod is shortened.

III. The energy consumption of the oil pumping machine at the node of stuffing box is too high.

SUMMARY OF THE INVENTION

In order to solve the above problems, the present invention provides a polished rod sealing device for an oil pumping machine, which realizes dynamic coaxiality between the polished rod and the stuffing box and thoroughly solves the problem of eccentric wear of the sealing packing resulted from the polished rod. The sealing device can also solve the problem of lubrication between the polished rod and the sealing packing.

According to the technical scheme of the present invention, the present invention provides a polished rod sealing device for an oil pumping machine, which comprises a built-in stuffing box, wherein the built-in stuffing box is arranged inside an oil pipe enlargement press cap and can be used to seal the polished rod of the oil pumping machine.

Furthermore, the polished rod sealing device for an oil pumping machine comprises: an oil pipe enlargement base, an oil pipe enlargement press cap, a built-in stuffing box, a first flexible connection unit, and a second flexible connection unit, wherein the built-in stuffing box is built into the oil pipe, the bottom of the built-in stuffing box is connected via the first flexible connection unit to the oil pipe enlargement base, the top of the built-in stuffing box is connected via the second flexible connection unit to the oil pipe enlargement press cap, and the oil pipe enlargement press cap is connected with the oil pipe enlargement base through a threaded connection.

Furthermore, the built-in stuffing box comprises: a stuffing box body, a press ring, a press ring liner, a gasket, and a gasket liner.

Furthermore, the built-in stuffing box is mounted in the oil pipe, the stuffing box body of the built-in stuffing box doesn't contact with the oil pipe enlargement press cap, and there is a space enough for radial movement between the stuffing box body of the built-in stuffing box and the oil pipe enlargement press cap; during the operation of the oil pumping machine, the built-in stuffing box moves along with the polished rod and produces corresponding radial displacement and angular displacement under the driving effect of the polished rod, so that the stuffing box body, the sealing packing, and the polished rod are coaxial dynamically, and thereby eccentric wear of the sealing packing resulted from the polished rod is prevented.

Furthermore, the polished rod sealing device for an oil pumping machine further comprises a solid lubricator, which is arranged at the top of the oil pipe enlargement press cap and has a lubricating material storage chamber that is large enough, the components of a solid lubricating material stored in the lubricating material storage chamber may include solid lubricant, polished rod preservative, and sealing packing healant, and the mixture ratio of the components can be adjusted according to the specific working condition. The advantages of using a solid lubricating material include: free of loss, low consumption, and long service time after replenishment.

Furthermore, the solid lubricator comprises: the oil pipe enlargement press cap, a top cover, a handle, holding slide plates, a snap ring, a pushing column, and a pushing ring, and is provided with a baffle plate and fastening bolts for assembling the holding slide plates.

The present invention realizes dynamic coaxiality between the polished rod and the sealing packing, and thoroughly solves the problem of eccentric wear of the sealing packing resulted from the polished rod; a solid lubricant always exists between the polished rod and the sealing packing, and effectively reduces abrasion and corrosion of the polished rod, and prolongs the service life of the sealing packing.

EMBODIMENTS

Hereunder the implementation, functional features and advantages of the present disclosure will be further detailed in embodiments with reference to the accompanying drawings.

Figure 8:
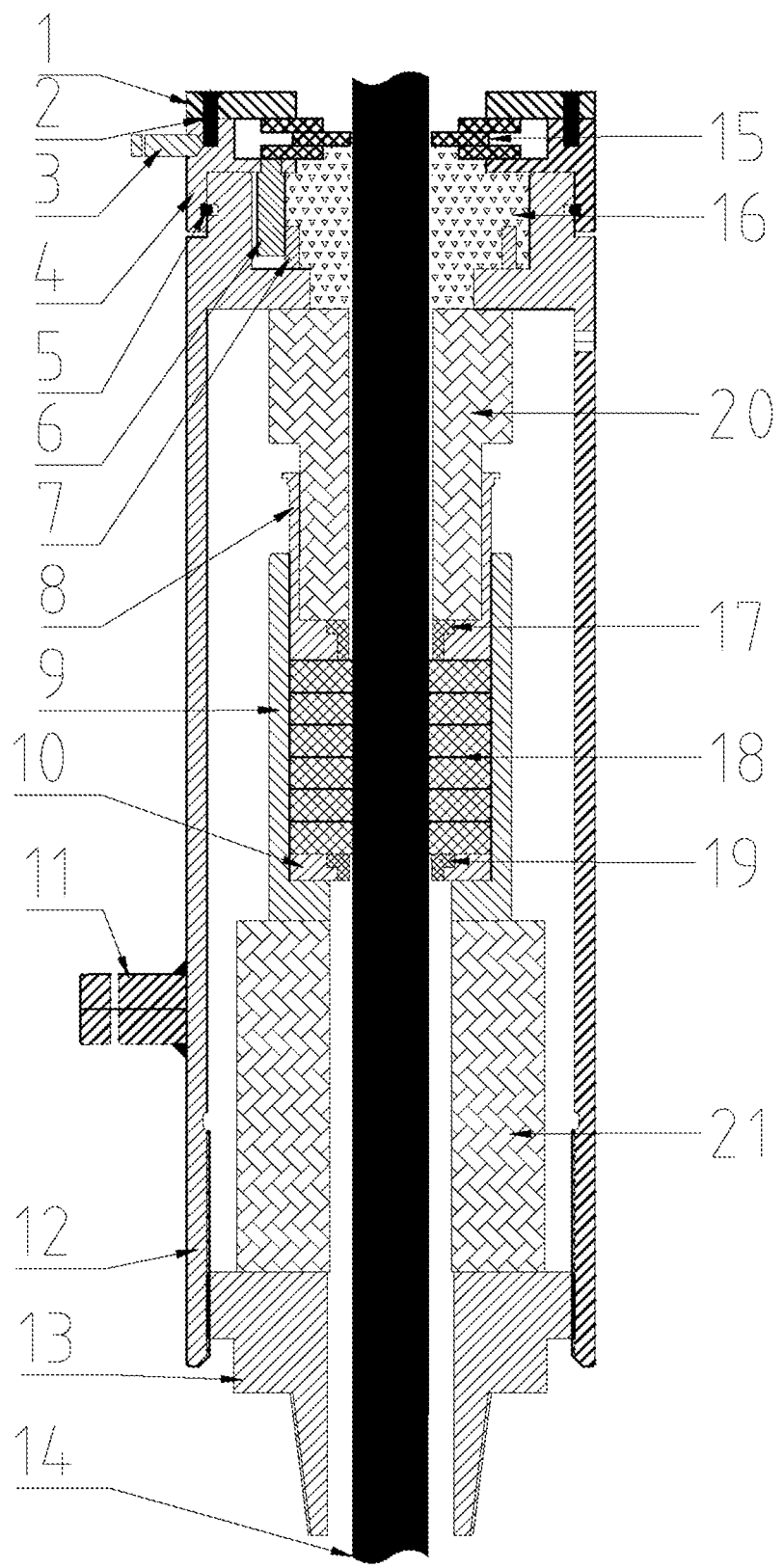
FIG. 8 is a front view showing the principle of the polished rod sealing device for an oil pumping machine according to the present invention.

As shown in FIG. 8, the polished rod sealing device of an oil pumping machine in the present invention comprises: an oil pipe enlargement base 13, an oil pipe enlargement press cap 12, a built-in stuffing box, a flexible connection unit 21, and a flexible connection unit 20, wherein the built-in stuffing box is built into the oil pipe, the bottom of the built-in stuffing box is connected via the flexible connection unit 21 to the oil pipe enlargement base 13, the top of the built-in stuffing box is connected via the flexible connection unit 20 to the oil pipe enlargement press cap 12, and the oil pipe enlargement press cap 12 is connected with the oil pipe enlargement base 13 through a threaded connection.

As shown in FIG. 8, the polished rod sealing device for an oil pumping machine in the present invention comprises a built-in stuffing box mounted in an oil pipe enlargement press cap, the built-in stuffing box doesn't contact with the wall of the oil pipe, and there is a space enough for radial movement between the built-in stuffing box and the wall of the oil pipe; the built-in stuffing box automatically moves along with the polished rod 14 in a radial direction and remains dynamically coaxial with the polished rod 14; thus, eccentric wear of the sealing packing 18 resulted from the polished rod 14 is prevented, and the service life of the sealing packing 18 is greatly improved.

The oil pipe enlargement press cap 12 is connected with the oil pipe enlargement base 13 through a threaded connection, and may be regarded as a topological extension of the oil pipe, and the threads have a degree of stroke. In that way, a telescopic hollow cavity is formed inside the oil pipe, the stuffing box is mounted in the cavity, the stuffing box body 9 doesn't contact with the oil pipe enlargement press cap 12, and there is a space enough for radial movement between the stuffing box body 9 and the oil pipe enlargement press cap 12; during an operation of the sucker-rod pumping machine, the sealing packing 18, the stuffing box body 9, the flexible connection unit 21, and the flexible connection unit 20 move in an interlocked manner, and the built-in stuffing box follows the polished rod to make radial displacement and angular displacement under the driving effect of the polished rod 14. Thus, the stuffing box body 9, the sealing packing 18, and the polished rod 14 are kept in a dynamically coaxial state, and thereby the eccentric wear of the sealing packing 18 resulted from the polished rod 14 is prevented, and the service life of the sealing packing 18 is improved greatly.

Wherein, the built-in stuffing box comprises: a stuffing box body 9, a press ring 8, a press ring liner 17, a gasket 10, and a gasket liner 19.

The built-in stuffing box is built into the oil pipe, the bottom of the built-in stuffing box is connected via the flexible connection unit 21 to the oil pipe enlargement base 13, and the top of the built-in stuffing box is connected via the flexible connection unit 20 to the oil pipe enlargement press cap 12. Furthermore, the polished rod sealing device for an oil pumping machine in the present invention further comprises a solid lubricator, which is arranged at the top of the oil pipe enlargement press cap 12. When the oil pumping machine works, the solid lubricating material 16 in the solid lubricator adheres to the polished rod to provide lubrication for the polished rod 14 and the sealing packing 18. The advantages of using a solid lubricating material include: free of loss, low consumption, and long service time after replenishment.

Specifically, when the handle 3 is turned, the pushing column 6 drives the pushing ring 7 to move eccentrically, so that the solid lubricating material 16 is pushed to adhere to the surface of the polished rod 14, thus the friction force between the polished rod 14 and the sealing packing 18 is reduced, and the purpose of protecting the polished rod 14, reducing the wear of the sealing packing 18 and reducing the sealing energy consumption is achieved; wherein, the holding slide plates 15 may be staggered from each other, and the middle layer of slide plates that have the smallest outer diameter always move along with the polished rod to ensure that the solid lubricating material will not be carried out of the storage chamber by the polished rod.

Wherein, the solid lubricator comprises: the oil pipe enlargement press cap 12, a top cover 4, a handle 3, holding slide plates 15, a snap ring 5, a pushing column 6, and a pushing ring 7, and is provided with a baffle plate 1 and fastening bolts 2 for assembling the holding slide plates 15.

The oil pipe enlargement press cap 12, the polished rod 14, and the top cover 4 are assembled to form the lubricating material storage chamber of the solid lubricator. The components of the solid lubricating material 16 include, but are not limited to lubricant, polished rod preservative, and sealing packing healant, and the mixture ratio of the components may be adjusted according to the specific working condition.

Furthermore, the polished rod sealing device for an oil pumping machine in the present invention further comprises a flexible connection unit 20 and a flexible connection unit 21, wherein the flexible connection unit 21 ensure that the stuffing box is sealed to the oil pipe and can endure proper downward pressure, wherein the flexible connection unit 20 only has to bear proper pressure and takes an effect of allowing the stuffing box body 9 to move along with the polished rod; the displacement of the stuffing box has a radial displacement component and an angular displacement component.

The material and specific structure of the flexible connection unit 20 and flexible connection unit 21 are not keys to the present invention, and are not within the protection scope of the present disclosure. Many ideal solutions can be obtained by utilizing existing flexible connection structures in engineering and mechanical fields or their combinations, variants, or improvements, with consideration of technical and economic evaluation indicators.

Embodiment 1

Figure 1:
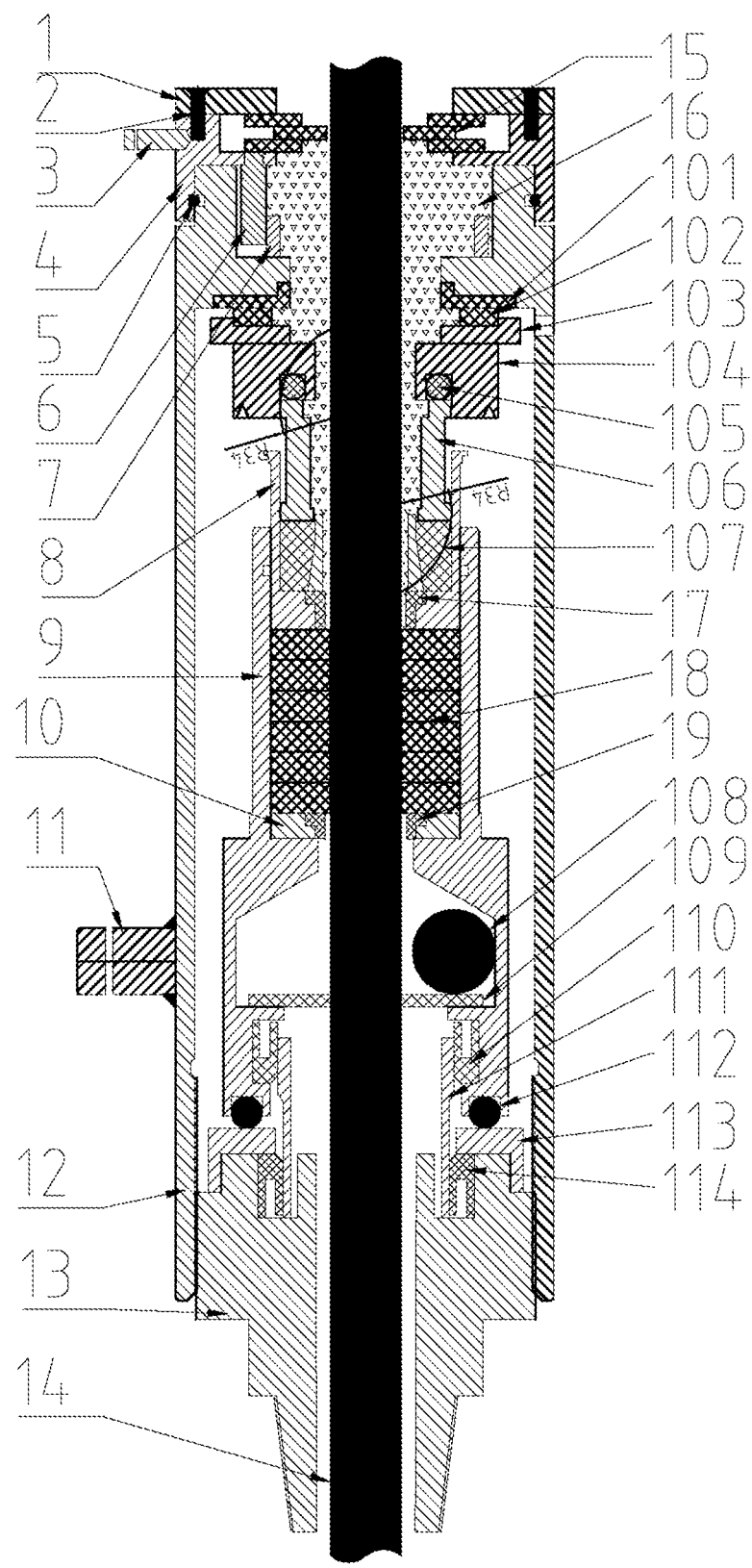
FIG. 1 shows the combined structure of the flexible connection unit in embodiment 1 of the present invention.

As shown in FIG. 1, in this embodiment, with reference to FIG. 8, the flexible connection unit 21 comprises: a U-shaped seal ring 114, a protective sleeve 113, a U-shaped seal ring 110, a steel seal ring 111 and an elastic support O-ring 112; the flexible connection unit 20 comprises: a nylon slide plate 101, a PTFE slide plate 102, a PTFE slide plate frame 103, a swing steel ring press cap 104, an elastic support O-ring 105, a swing steel ring 106, and an elastic support body 107.

Installation: as shown in FIG. 1, the oil pipe enlargement base 13 is connected to the oil pipe through a tapered thread connection, the U-shaped seal ring 114, the protective sleeve 113, the steel seal ring 111, the U-shaped seal ring 110, the elastic support O-ring 112, the stuffing box body 9, the gasket 10, the gasket liner 19, the sealing packing 18, the press ring 8, the elastic support body 107, the swing steel ring 106, the elastic support O-ring 105, the swing steel ring press cap 104, the PTFE slide plate frame 103, and the PTFE slide plate 102 are sleeved on the polished rod sequentially from bottom to top, the oil pipe enlargement press cap 12 is sleeved on the polished rod, pushed downward and connected to the oil pipe enlargement base 13 through a threaded connection at proper elevation. In that process, the rotation of the oil pipe enlargement press cap 12 and the nylon slide plate 101 don't drive the PTFE slide plate 102 and the PTFE slide plate frame 103 to rotate, the polished rod is kept in a normal position; then the snap ring 5 is pinched and the top cover 4 is removed, then the lubricant 16 is filled and the top cover 4 is mounted in position again; then the oil pumping machine is started, and the handle 3 is turned by several turns in a down-stroke. Now, the installation is completed.

Working principle:

When the polished rod 14 shakes and swings in the working process of the oil pumping machine, the polished rod 14 applies different radial thrusts to the sealing packing at different axial elevations, the different radial thrusts are transferred to the stuffing box body 9 so that the stuffing box body 9 is pushed; the stuffing box body 9 has the same radial displacement as the polished rod 14 at the same axial elevation, and the stuffing box body 9 and the sealing packing 18 remain dynamically coaxial with the polished rod 14. In that process, the steel seal ring 111 and the swing steel ring 106 move synchronously, the portions of the steel swing ring 106 with enlarged outer diameter at the two ends of the steel swing ring 106 have a degree of radian and can swing freely, allowing the stuffing box body 9 to make radial displacement and angular displacement.

In summary:

The polished rod sealing device for an oil pumping machine comprises a built-in stuffing box, which is mounted in the oil pipe, and the stuffing box body 9 of the built-in stuffing box doesn't contact with the oil pipe enlargement press cap 12, and there is a space enough for radial movement between the stuffing box body 9 of the built-in stuffing box and the oil pipe enlargement press cap 12; under the driving effect of the polished rod 14 when the oil pumping machine works, the built-in stuffing box moves along with the polished rod 14 and produces corresponding radial displacement and angular displacement. Thus, the stuffing box body 9, the sealing packing 18, and the polished rod 14 remain dynamically coaxial with each other.

Furthermore, the polished rod sealing device for an oil pumping machine further comprises a solid lubricator, which is arranged at the top of the device and has a lubricating material storage chamber that is large enough, the components of a solid lubricating material 16 stored in the lubricating material storage chamber may include solid lubricant, polished rod preservative, and sealing packing healant, and the mixture ratio of the components may be adjusted according to the specific working condition. The advantages of using a solid lubricating material include: free of loss, low consumption, and long service time after replenishment.

Embodiment 2

Figure 2:
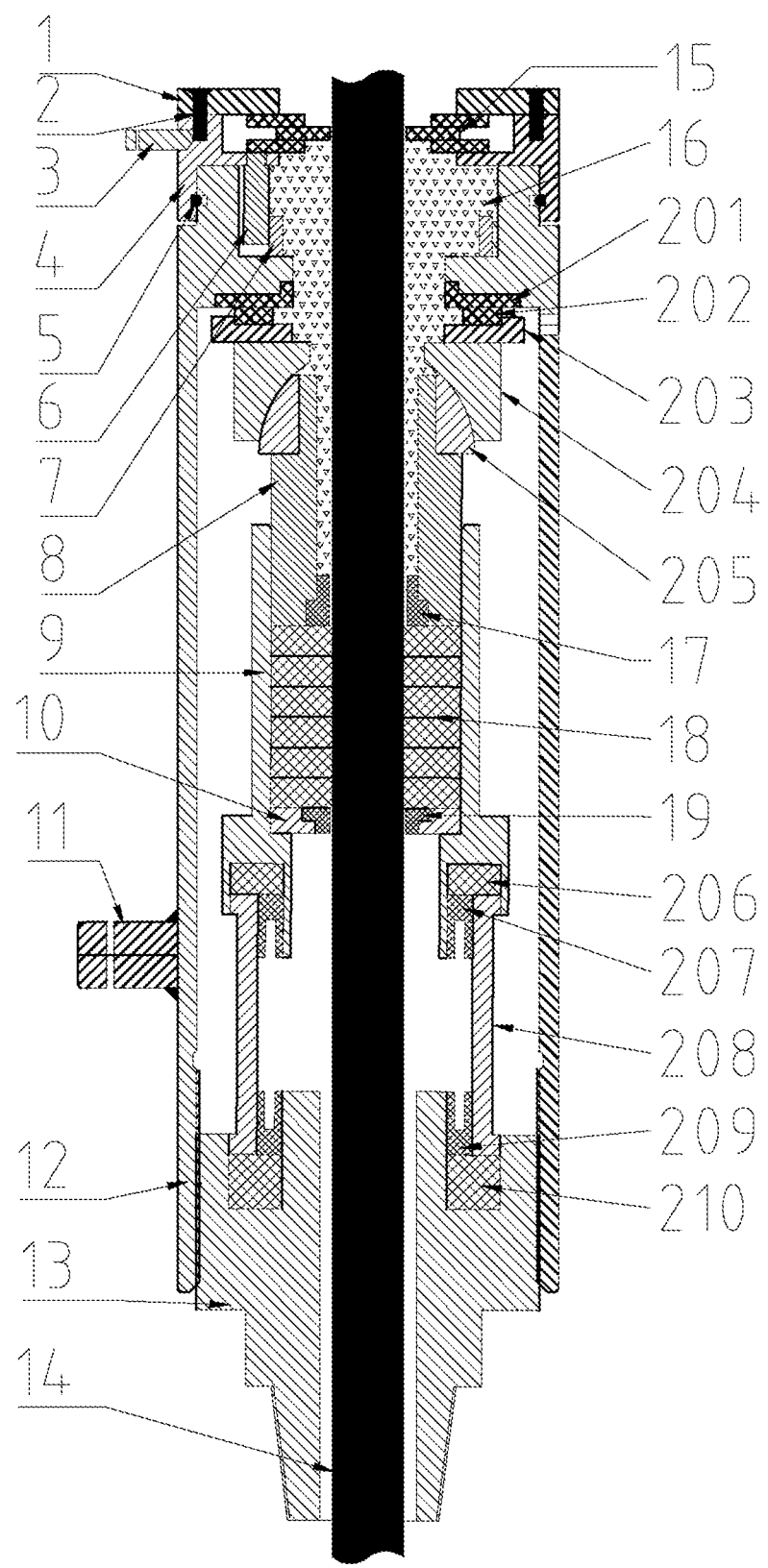
FIG. 2 shows the combined structure of the flexible connection unit in embodiment 2 of the present invention.

As shown in FIG. 2, in this embodiment, with reference to FIG. 8, the flexible connection unit 21 comprises: an elastic support sleeve 210, a U-shaped seal ring 209, a steel seal ring 208, a U-shaped seal ring 207, and an elastic support sleeve 206; the flexible connection unit 20 comprises: a lower knuckle bearing 205, an upper knuckle bearing 204, a PTFE slide plate frame 203, a PTFE slide plate 202, and a nylon slide plate 201.

Installation: as shown in FIG. 2, the oil pipe enlargement base 13 is connected to the wellhead through a tapered thread connection, the elastic support sleeve 210, the U-shaped seal ring 209, the steel seal ring 208, the U-shaped seal ring 207, the elastic support sleeve 206, the stuffing box body 9, the gasket 10, the gasket liner 19, the sealing packing 18, the press ring 8, the lower knuckle bearing 205, the upper knuckle bearing 204, the PTFE slide plate frame 203, and the PTFE slide plate 202 are sleeved on the polished rod sequentially from bottom to top, the oil pipe enlargement press cap 12 is sleeved on the polished rod, pushed downward and connected to the wellhead enlargement base 13 through a threaded connection at proper elevation. In that process, the rotation of the press cap 12 and the nylon slide plate 201 don't drive the PTFE slide plate 202 and the PTFE slide plate frame 203 to rotate, the polished rod is kept in a normal position; then the snap ring 5 is pinched and the top cover 4 is removed, then the lubricant 16 is filled and the top cover 4 is mounted in position again; then the oil pumping machine is started, and the handle 3 is turned by several turns in a down-stroke. Now, the installation is completed.

Working principle:

When the polished rod 14 shakes and swings in the working process of the oil pumping machine, the polished rod 14 applies different radial thrusts to the sealing packing at different axial elevations, the different radial thrusts are transferred to the stuffing box body 9 so that the stuffing box body 9 is pushed; the stuffing box body 9 has the same radial displacement as the polished rod 14 at the same axial elevation, and the stuffing box body 9 and the sealing packing 18 remain dynamically coaxial with the polished rod 14. In that process, the steel seal ring 208, the lower knuckle bearing 205, and the upper knuckle bearing 204 move synchronously, allowing the stuffing box body 9 to make radial displacement and angular displacement.

Embodiment 3

Figure 3:
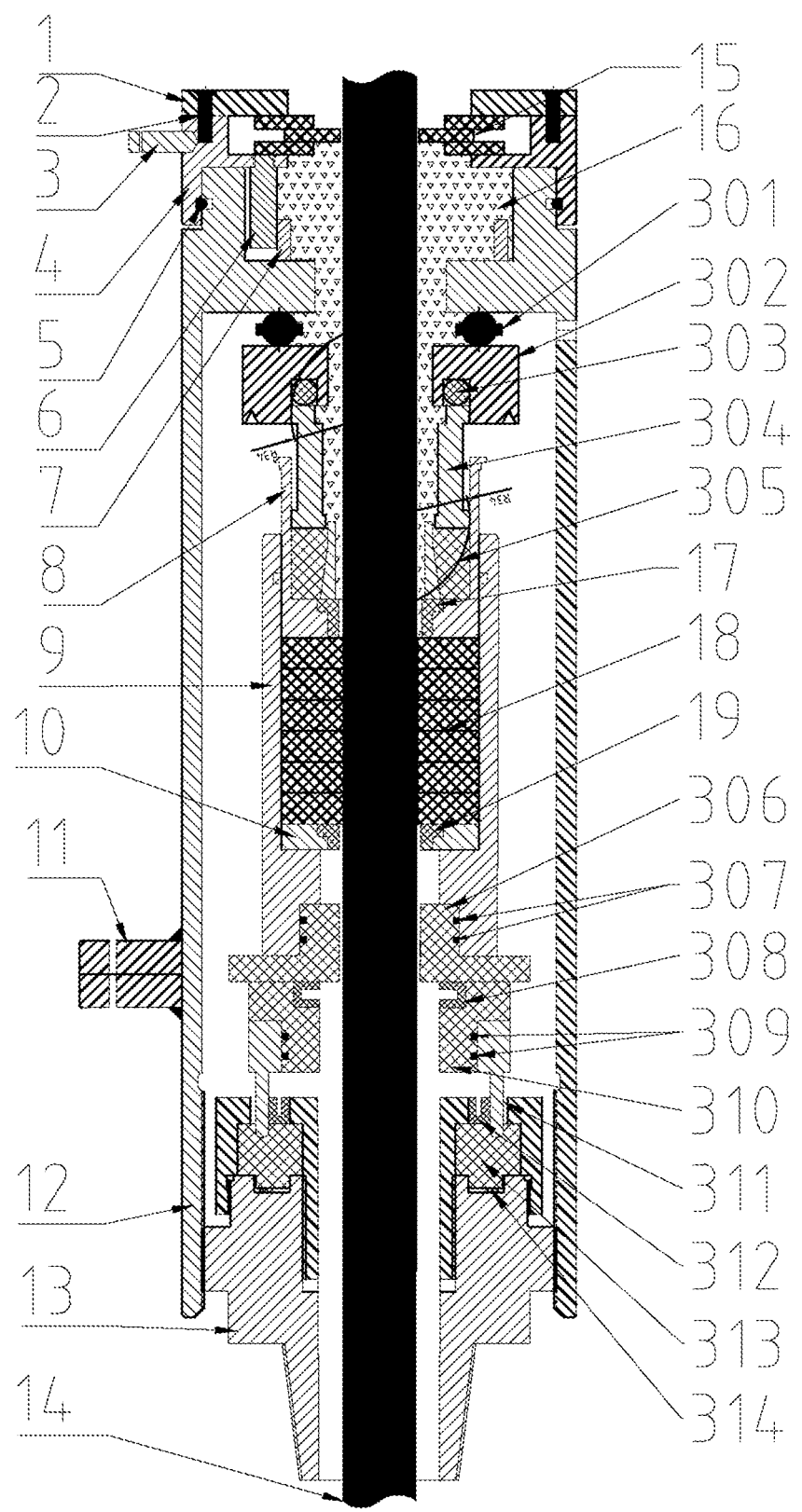
FIG. 3 shows the combined structure of the flexible connection unit in embodiment 3 of the present invention.

As shown in FIG. 3, in this embodiment, with reference to FIG. 8, the flexible connection unit 21 comprises: a combined seal ring 314, an elastic support sleeve 313, a U-shaped seal ring 312, a swing steel seal ring 311, a PTFE slide ring 310, an O-shaped seal ring 309, an U-shaped seal ring 308, an O-shaped seal ring 307, and a nylon slide ring 306; the flexible connection unit 20 comprises: an elastic support body 305, a swing steel ring 304, an elastic support O-ring 303, a swing steel ring press cap 302, and a thrust bearing 301.

Installation: as shown in FIG. 3, the oil pipe enlargement base 13 is connected to the wellhead through a tapered thread connection, the combined seal ring 314, the elastic support sleeve 313, the U-shaped seal ring 312, the swing steel seal ring 311, the O-shaped seal ring 309, the PTFE slide ring 310, the U-shaped seal ring 308, the O-shaped seal ring 307, the nylon slide ring 306, the stuffing box body 9, the gasket 10, the gasket liner 19, the sealing packing 18, the press ring 8, the elastic support body 305, the swing steel ring 304, the elastic support O-ring 303, the swing steel ring press cap 302, and the thrust bearing 301 are sleeved on the polished rod sequentially from bottom to top, the press cap 12 is sleeved on the polished rod, pushed downward and connected to the wellhead enlargement base 13 through a threaded connection at proper elevation. In that process, the rotation of the pressure cap 12 doesn't drive the thrust bearing 301 and the swing steel ring press cap 302 to rotate, the polished rod is kept in a normal position; then the snap ring 5 is pinched and the top cover 4 is removed, then the lubricant 16 is filled and the top cover 4 is mounted in position again; then the oil pumping machine is started, and the handle 3 is turned by several turns in a down-stroke. Now, the installation is completed.

Working principle:

When the polished rod 14 shakes and swings in the working process of the oil pumping machine, the polished rod 14 applies different radial thrusts to the sealing packing at different axial elevations, the different radial thrusts are transferred to the stuffing box body 9 so that the stuffing box body 9 is pushed; the stuffing box body 9 has the same radial displacement as the polished rod 14 at the same axial elevation, and the stuffing box body 9 and the sealing packing 18 remain dynamically coaxial with the polished rod 14. In that process, the swing steel seal ring 311, the PTFE slide ring 310, the nylon slide ring 306, the swing steel ring 304, and the thrust bearing 301 move synchronously, allowing the stuffing box body 9 to make radial displacement and angular displacement.

Embodiment 4

Figure 4:
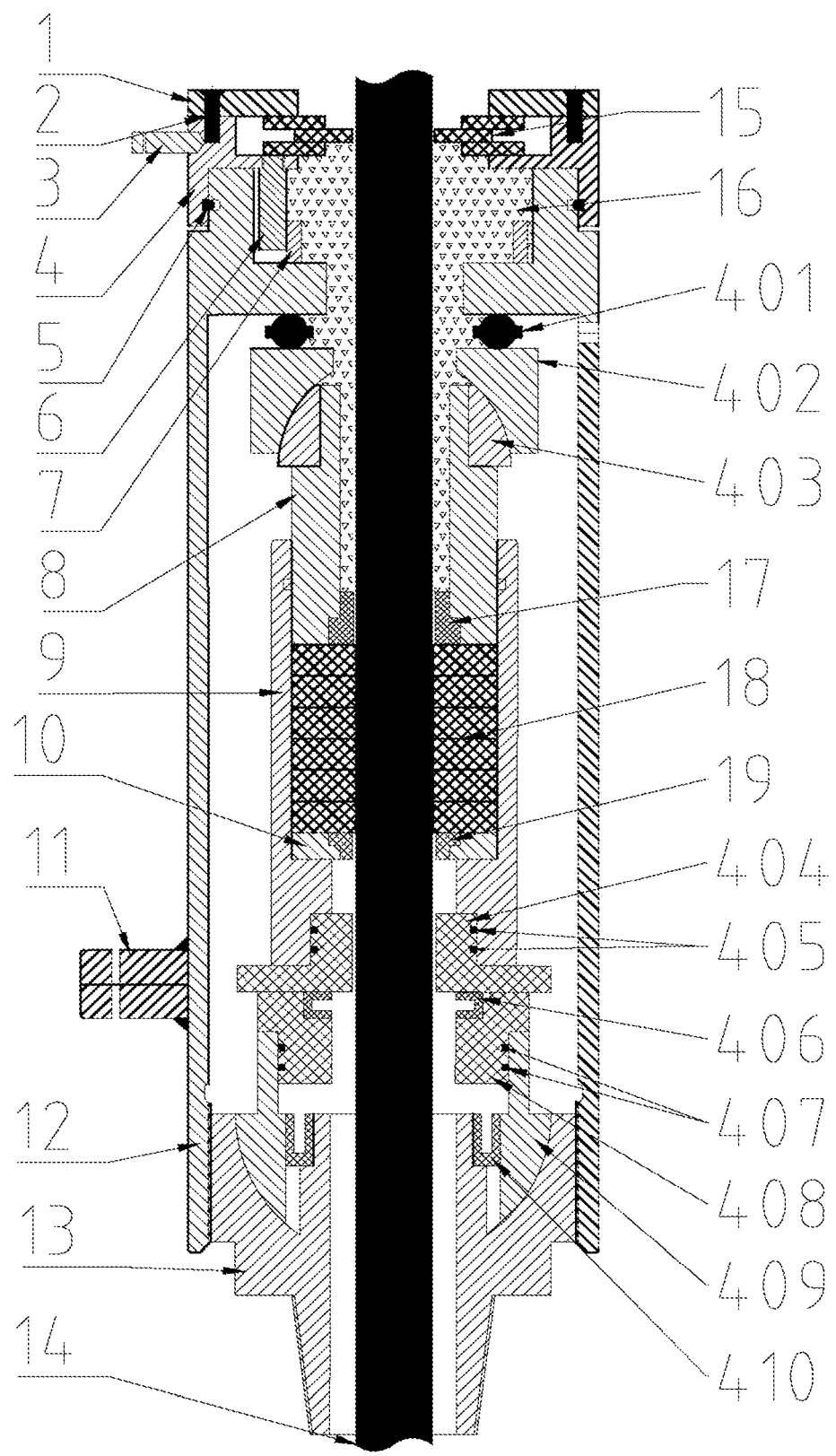
FIG. 4 shows the combined structure of the flexible connection unit in embodiment 4 of the present invention.

As shown in FIG. 4, in this embodiment, with reference to FIG. 8, the flexible connection unit 21 comprises: a hemispherical swing steel seal ring 409, a U-shaped seal ring 410, an O-shaped seal ring 407, a PTFE slide ring 408, a U-shaped seal ring 406, an O-shaped seal ring 405, and a nylon slide ring 404; the flexible connection unit 20 comprises: a lower knuckle bearing 403, an upper knuckle bearing 402, and a thrust bearing 401.

Installation: as shown in FIG. 4, the oil pipe enlargement base 13 is connected to the wellhead through a tapered thread connection, the hemispherical swing steel seal ring 409, the U-shaped seal ring 410, the O-shaped seal ring 407, the PTFE slide ring 408, the U-shaped seal ring 406, the O-shaped seal ring 405, the nylon slide ring 404, the stuffing box body 9, the gasket 10, the gasket liner 19, the sealing packing 18, the press ring 8, the lower knuckle bearing 403, the upper knuckle bearing 402, and the thrust bearing 401 are sleeved on the polished rod sequentially from bottom to top, the press cap 12 is sleeved on the polished rod, pushed downward and connected to the wellhead enlargement base 13 through a threaded connection at proper elevation. In that process, the rotation of the pressure cap 12 doesn't drive the thrust bearing 401 and the upper knuckle bearing 402 to rotate, the polished rod is kept in a normal position; then the snap ring 5 is pinched and the top cover 4 is removed, then the lubricant 16 is filled and the top cover 4 is mounted in position again; then the oil pumping machine is started, and the handle 3 is turned by several turns in a down-stroke. Now, the installation is completed.

Working principle:

When the polished rod 14 shakes and swings in the working process of the oil pumping machine, the polished rod 14 applies different radial thrusts to the sealing packing at different axial elevations, the different radial thrusts are transferred to the stuffing box body 9 so that the stuffing box body 9 is pushed; the stuffing box body 9 has the same radial displacement as the polished rod 14 at the same axial elevation, and the stuffing box body 9 and the sealing packing 18 remain dynamically coaxial with the polished rod 14. In that process, the hemispherical swing steel seal ring 409, the PTFE slide ring 408, the nylon slide ring 404, lower knuckle bearing 403, the upper knuckle bearing 402, and the thrust bearing 401 move synchronously, allowing the stuffing box body 9 to make radial displacement and angular displacement.

Embodiment 5

Figure 5:
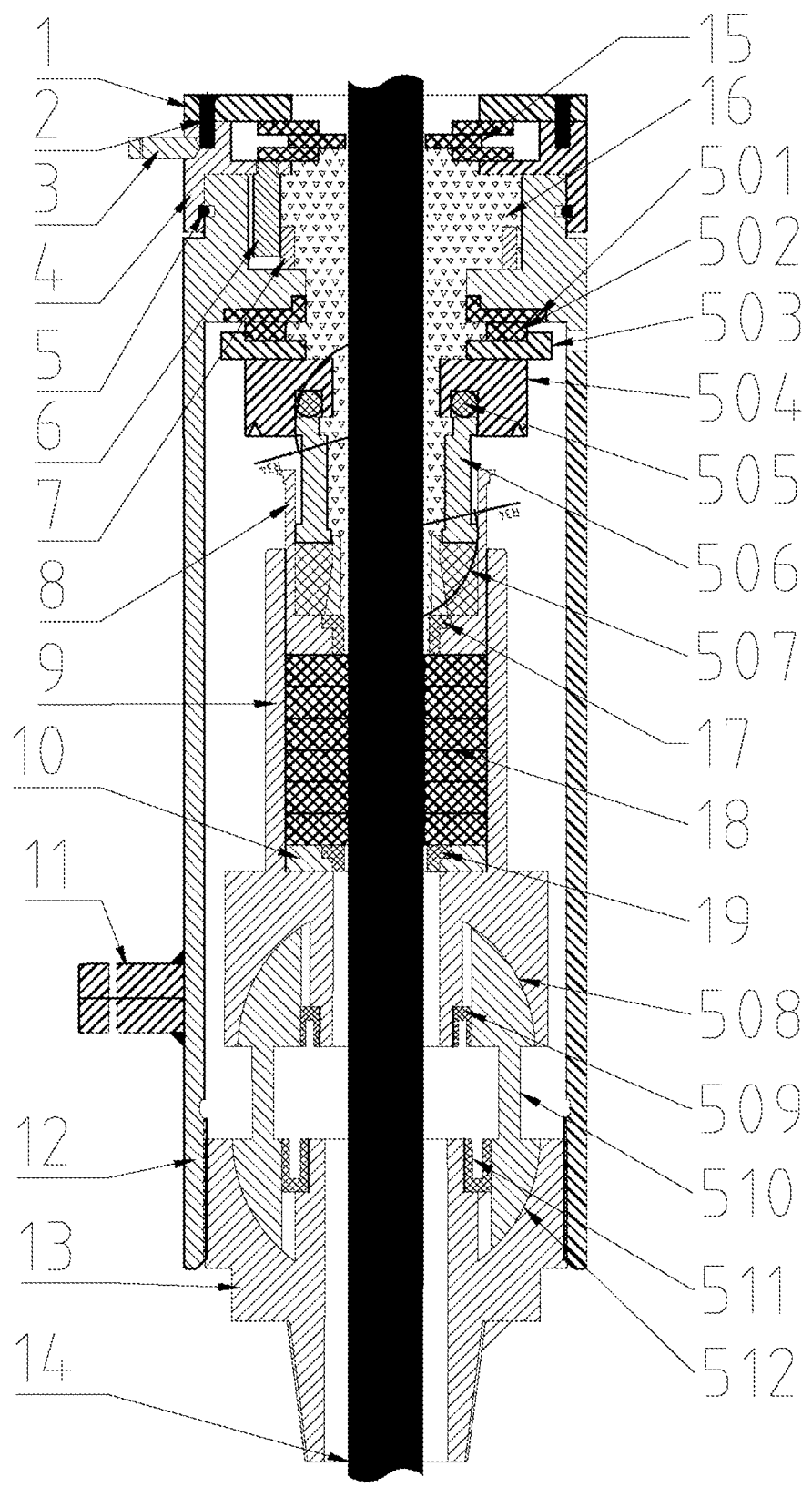
FIG. 5 shows the combined structure of the flexible connection unit in embodiment 5 of the present invention.

As shown in FIG. 5, in this embodiment, with reference to FIG. 8, the flexible connection unit 21 comprises: a U-shaped seal ring 511, a U-shaped seal ring 509, and a bi-hemispherical swing steel seal ring 510; the flexible connection unit 20 comprises: a nylon slide plate 501, a PTFE slide plate 502, a PTFE slide plate frame 503, a swing steel ring press cap 504, an elastic support O-ring 505, a swing steel ring 506, and an elastic support body 507.

Installation: as shown in FIG. 5, the oil pipe enlargement base 13 is connected to the wellhead through a tapered thread connection, the U-shaped seal ring 511 the U-shaped seal ring 509, the bi-hemispherical swing steel seal ring 510, the stuffing box body 9, the gasket 10, the gasket liner 19, the sealing packing 18, the press ring 8, the elastic support body 507, the swing steel ring 506, the elastic support O-ring 505, the swing steel ring press cap 504, the PTFE slide plate frame 503, the PTFE slide plate 502, and the nylon slide plate 501 are sleeved on the polished rod sequentially from bottom to top, the press cap 12 is sleeved on the polished rod, pushed downward and connected to the wellhead enlargement base 13 through a threaded connection at proper elevation. In that process, the rotation of the press cap 12 and the nylon slide plate 501 don't drive the PTFE slide plate 502 and the PTFE slide plate frame 503 to rotate, the polished rod is kept in a normal position; then the snap ring 5 is pinched and the top cover 4 is removed, then the lubricant 16 is filled and the top cover 4 is mounted in position again; then the oil pumping machine is started, and the handle 3 is turned by several turns in a down-stroke. Now, the installation is completed.

Working principle:

When the polished rod 14 shakes and swings in the working process of the oil pumping machine, the polished rod 14 applies different radial thrusts to the sealing packing at different axial elevations, the different radial thrusts are transferred to the stuffing box body 9 so that the stuffing box body 9 is pushed; the stuffing box body 9 has the same radial displacement as the polished rod 14 at the same axial elevation, and the stuffing box body 9 and the sealing packing 18 remain dynamically coaxial with the polished rod 14. In that process, the bi-hemispherical swing steel seal ring 510 and the swing steel ring 506 move synchronously, allowing the stuffing box body 9 to make radial displacement and angular displacement.

Embodiment 6

Figure 6:
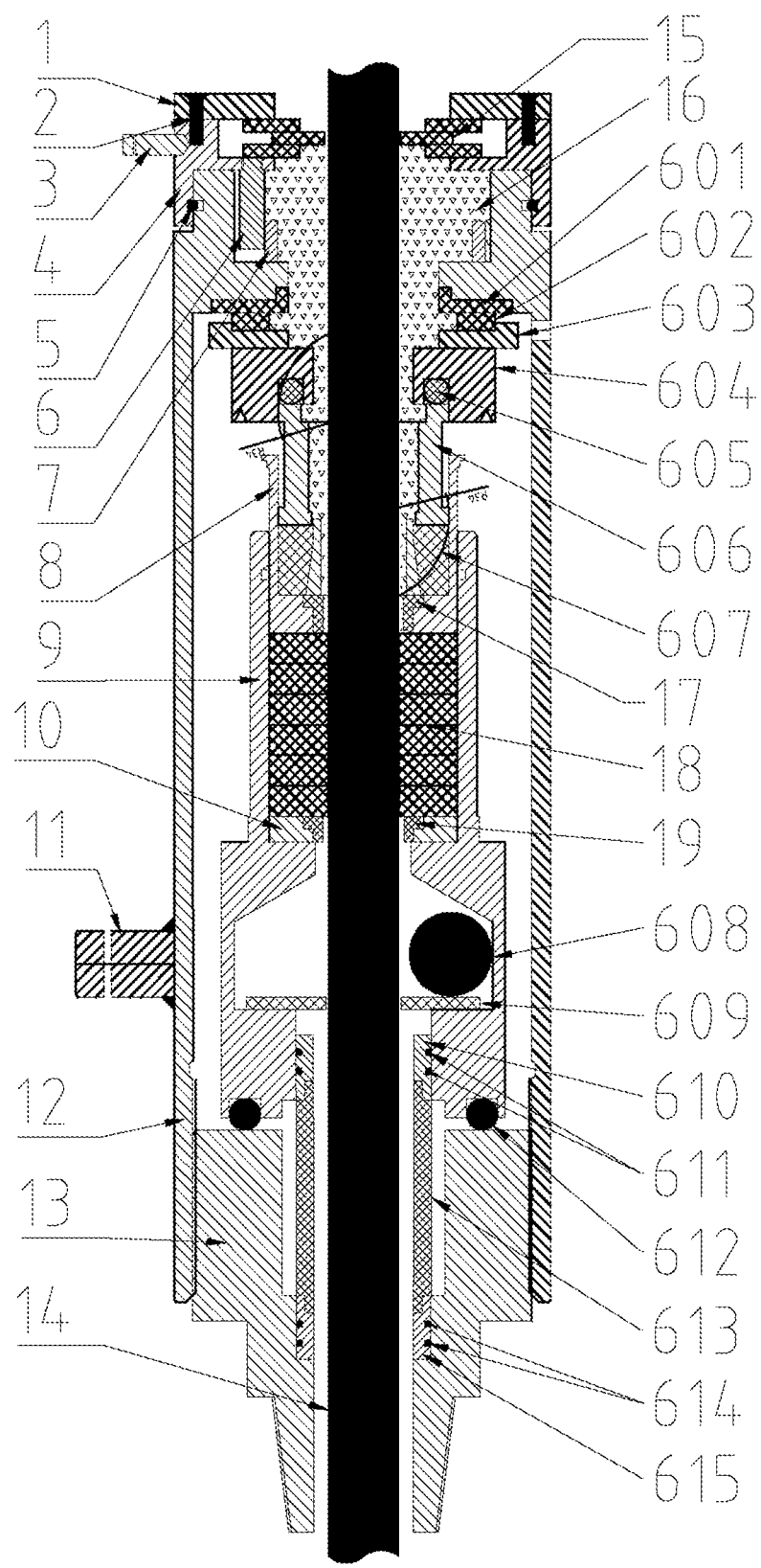
FIG. 6 shows the combined structure of the flexible connection unit in embodiment 6 of the present invention.

As shown in FIG. 6, in this embodiment, with reference to FIG. 8, the flexible connection unit 21 comprises: a burst-resisting hose 613 (stainless steel closures 610 and 615 are fixed at the two ends, the stainless steel closures 610 and 615 have a smooth surface with a O-ring groove respectively), an O-shaped seal ring 611, an O-shaped seal ring 614, and an elastic support O-ring 612; the flexible connection unit 20 comprises: an elastic support body 607, a swing steel ring 606, an elastic support O-ring 605, a swing steel ring press cap 604, a PTFE slide plate frame 603, a PTFE slide plate 602, and a nylon slide plate 601.

Installation: as shown in FIG. 6, the oil pipe enlargement base 13 is connected to the oil pipe through a tapered thread connection, the burst-resisting hose 613 (stainless steel closures 610 and 615 are fixed at the two ends, and the stainless steel closures 610 have a smooth surface with an O-ring groove respectively), the O-shaped seal ring 611, the O-shaped seal ring 614, the elastic support O-ring 612, the stuffing box body 9, the gasket 10, the gasket liner 19, the sealing packing 18, the press ring 8, the elastic support body 607, the swing steel ring 606, the elastic support O-ring 605, the swing steel ring press cap 604, the PTFE slide plate frame 603, the PTFE slide plate 602, and the nylon slide plate 601 are sleeved on the polished rod sequentially from bottom to top, the press cap 12 is sleeved on the polished rod, pushed downward and connected to the oil pipe enlargement base 13 through a threaded connection at proper elevation. In that process, the rotation of the press cap 12 and the nylon slide plate 601 don't drive the PTFE slide plate 602 and the PTFE slide plate frame 603 to rotate, the polished rod is kept in a normal position; then the snap ring 5 is pinched and the top cover 4 is removed, then the lubricant 16 is filled and the top cover 4 is mounted in position again; then the oil pumping machine is started, and the handle 3 is turned by several turns in a down-stroke. Now, the installation is completed.

Working principle:

When the polished rod 14 shakes and swings in the working process of the oil pumping machine, the polished rod 14 applies different radial thrusts to the sealing packing at different axial elevations, the different radial thrusts are transferred to the stuffing box body 9 so that the stuffing box body 9 is pushed; the stuffing box body 9 has the same radial displacement as the polished rod 14 at the same axial elevation, and the stuffing box body 9 and the sealing packing 18 remain dynamically coaxial with the polished rod 14. In that process, the burst-resisting hose 613 and the swing steel ring 606 move synchronously, the portions of the steel swing ring 606 with enlarged outer diameter at the two ends of the steel swing ring 606 have a degree of radian and can swing freely, allowing the stuffing box body 9 to make radial displacement and angular displacement.

Embodiment 7

Figure 7:
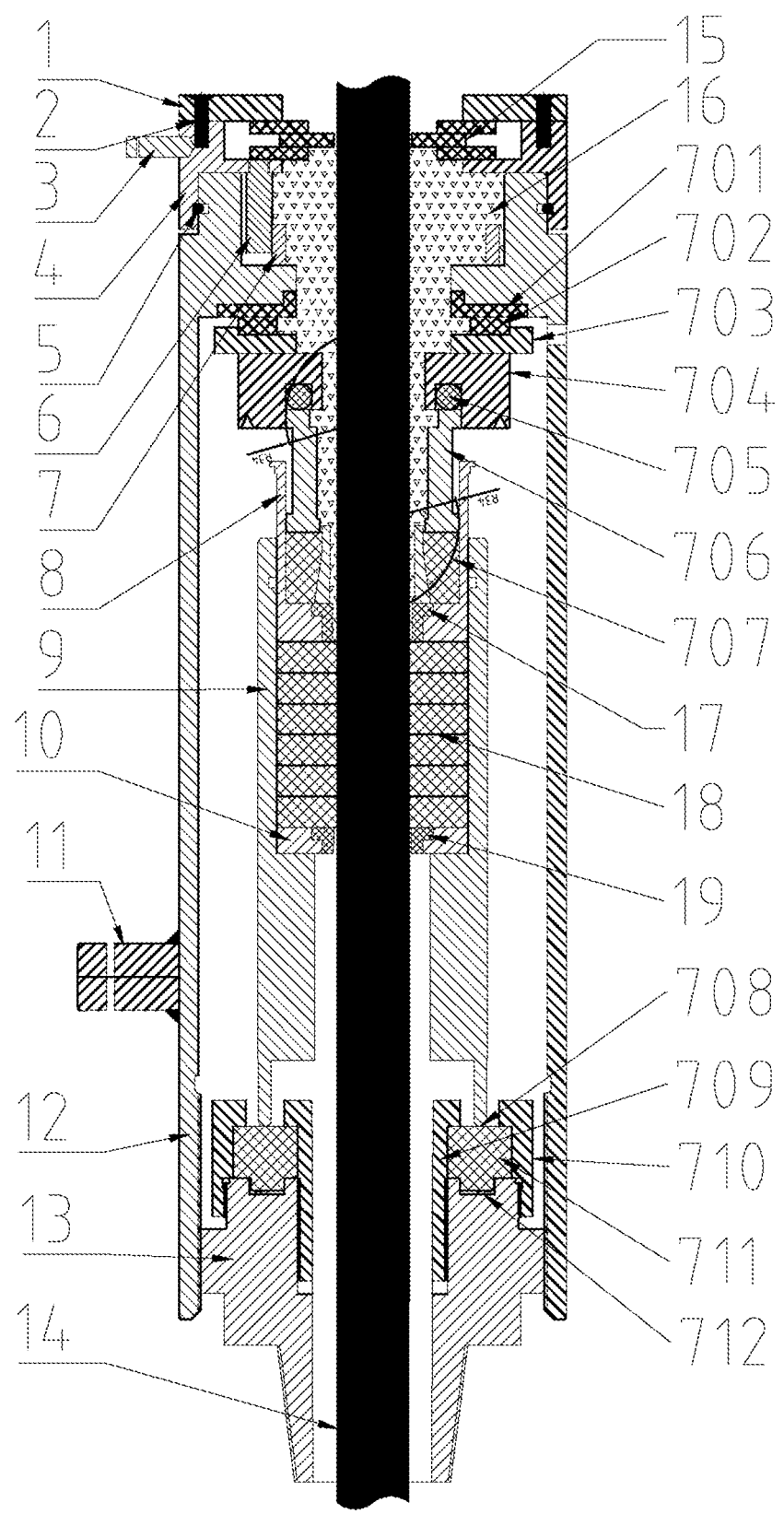
FIG. 7 shows the combined structure of the flexible connection unit in embodiment 7 of the present invention.

As shown in FIG. 7, in this embodiment, with reference to FIG. 8, the flexible connection unit 21 comprises: a combined seal ring 712, an elastic support sleeve 711, an outer sheath of elastic support sleeve 710 (connected to the base through a threaded connection), and an inner sheath of elastic support sleeve 709 (connected to the base through a threaded connection); the flexible connection unit 20 comprises: an elastic support body 707, a swing steel ring 706, an elastic support O-ring 705, a swing steel ring press cap 704, a PTFE slide plate frame 703, a PTFE slide plate 702, and a nylon slide plate 701.

Installation: as shown in FIG. 7, the oil pipe enlargement base 13 is connected to the wellhead through a tapered thread connection, the combined seal ring 712, the elastic support sleeve 711, the outer sheath of elastic support sleeve 710 (connected to the base through a threaded connection), the inner sheath of elastic support sleeve 709 (connected to the base through a threaded connection), the stuffing box body 9, the gasket 10, the gasket liner 19, the sealing packing 18, the press ring 8, the elastic support body 707, the swing steel ring 706, the elastic support O-ring 705, the swing steel ring press cap 704, the PTFE slide plate frame 703, the PTFE slide plate 702, and the nylon slide plate 701 are sleeved on the polished rod, and the press cap 12 is sleeved on the polished rod, pushed downward, and connected to the wellhead enlargement base 13 through a threaded connection at proper elevation. In that process, the rotation of the press cap 12 and the nylon slide plate 701 don't drive the PTFE slide plate 702 and the PTFE slide plate frame 703 to rotate, the polished rod is kept in a normal position; then the snap ring 5 is pinched and the top cover 4 is removed; then the lubricant 16 is filled and the top cover 4 is mounted in position again; next, the oil pumping machine is started, and the handle 3 is turned by several turns in a down-stroke. Now, the installation is completed.

Working principle:

When the polished rod 14 shakes and swings in the working process of the oil pumping machine, the polished rod 14 applies different radial thrusts to the sealing packing at different axial elevations, the different radial thrusts are transferred to the stuffing box body 9 so that the stuffing box body 9 is pushed; the stuffing box body 9 has the same radial displacement as the polished rod 14 at the same axial elevation, and the stuffing box body 9 and the sealing packing 18 remain dynamically coaxial with the polished rod 14. In that process, the elastic support sleeve 711 and the swing steel ring 706 move synchronously, the portions of the steel swing ring 706 with enlarged outer diameter at the two ends of the steel swing ring 706 have a degree of radian and can swing freely, allowing the stuffing box body 9 to make radial displacement and angular displacement.

While some embodiments have been described above, those embodiments are only for illustration and don't constitute any limitation to the protection scope of the present disclosure. In fact, the embodiments described herein can be implemented in various variants. That is to say, based on the spirit of the present disclosure, various omissions, replacements, modifications and other variations can be made to the above embodiments. Such modifications or variations are encompassed by the appended claims and fall into the protection scope of the present disclosure.

We claim:

1. A polished rod sealing device for an oil pumping machine, comprising a built-in stuffing box containing a sealing packing, wherein the built-in stuffing box is arranged inside an oil pipe enlargement press cap and the sealing packing is configured to seal the polished rod of the oil pumping machine,
wherein the built-in stuffing box comprises: a stuffing box body, a press ring, a press ring liner, a gasket, and a gasket liner,
wherein the stuffing box body and the oil pipe enlargement press cap are spaced apart to allow a radial movement therebetween, and,
during the operation of the oil pumping machine, the built-in stuffing box moves along with the polished rod and produces a corresponding radial displacement and angular displacement so that the stuffing box body, the sealing packing, and the polished rod maintain dynamic coaxiality, thereby reducing eccentric wear of the sealing packing by the polished rod.

2. The polished rod sealing device for an oil pumping machine according to claim 1, further comprising: an oil pipe enlargement base, a first flexible connection unit, and a second flexible connection unit, wherein the bottom of the built-in stuffing box is connected to the oil pipe enlargement base by the first flexible connection unit, the top of the built-in stuffing box is connected to the oil pipe enlargement press cap by the second flexible connection unit, and the oil pipe enlargement press cap is connected with the oil pipe enlargement base by a threaded connection.

3. The polished rod sealing device for an oil pumping machine according to claim 1, further comprising: a solid lubricator arranged at the top of the oil pipe enlargement press cap and comprises a solid lubricating material storage chamber containing a solid lubricating material selected from a solid lubricant, a polished rod preservative, and a sealing packing healant.

4. The polished rod sealing device for an oil pumping machine according to claim 3, wherein the solid lubricator comprises: the oil pipe enlargement press cap, a top cover, a handle, holding slide plates, a snap ring, a pushing column, and a pushing ring, and is provided with a baffle plate and fastening bolts for assembling the holding slide plates.

* * * * *